Aug. 21, 1951 H. M. REED 2,565,091
TRUCK HOIST
Filed Dec. 12, 1949 2 Sheets-Sheet 1

Inventor
Harry M. Reed
BY Buckhorn and Cheatham
Attorneys

INVENTOR.
Harry M. Reed

Patented Aug. 21, 1951

2,565,091

UNITED STATES PATENT OFFICE 2,565,091

TRUCK HOIST

Harry M. Reed, Hubbard, Oreg.

Application December 12, 1949, Serial No. 132,601

6 Claims. (Cl. 212—65)

My present invention comprises a freight handling, portable, electric hoist for removable association with a vehicle such as a truck. The principal object of the present invention is to provide a compact power hoist which may be mounted within the body of a truck or the like for elevating and lowering heavy freight.

A further object of the present invention is to provide a device of the foregoing character which is relatively compact and of light weight whereby the apparatus may be shifted from one truck to another in order that a fleet of trucks provided with hoist mounting means of relatively simple nature may have a single hoist selectively associated therewith.

A further object of the present invention is to provide a hoist of the foregoing character which does not occupy much of the cargo-carrying space and which does not materially obstruct the rear end of the truck, the boom of which may be swung through the rear end of the truck when in use and may be aligned with the rear end of the truck or a side wall when the truck is moving about.

A further object of the present invention is to provide a hoist of the foregoing character which may be operated from any convenient position by an operator moving about within the truck or upon the ground alongside of, or behind, the truck.

A further object of the present invention is to provide a mechanism of the foregoing character which is constructed of durable members of relatively simple nature and which is light enough to be moved from truck to truck by a single person.

The objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawing, Fig. 1 is a side elevation of a hoist constructed in accordance with the present invention, with parts broken away for illustration and showing the means for mounting the same in a truck body;

Figures 1, 2:
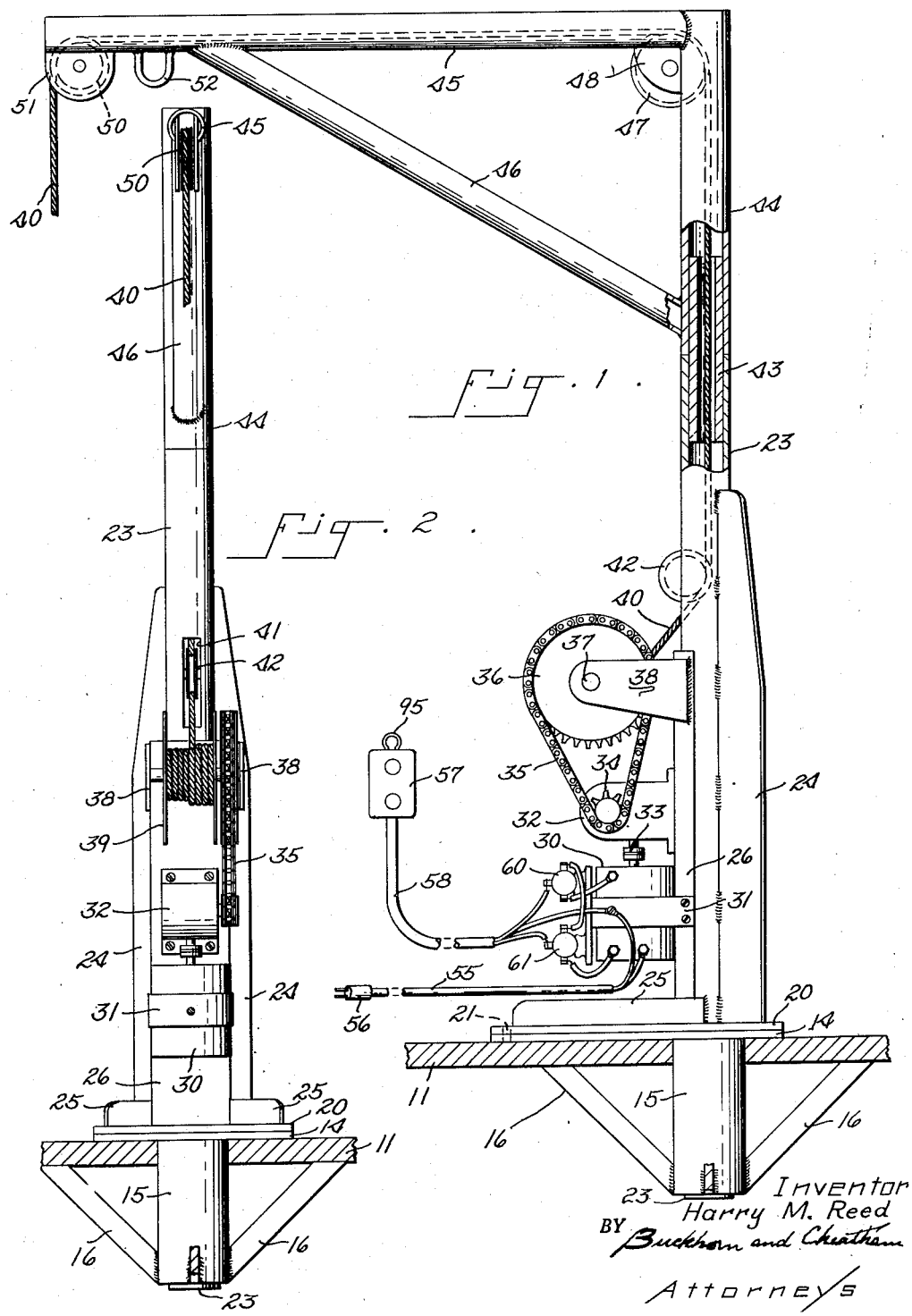
Fig. 2 is a front elevation of the apparatus with the electrical control means removed therefrom.

In accordance with the present invention a truck 10 or other vehicle having a cargo-carrying bed 11 and provided with an end gate 12 or other closure means may have a hoist constructed in accordance with the present invention mounted therein by providing a socket member in a portion of the truck bed. In the preferred illustration the socket member comprises a floor plate 14 having a short length of tube 15 welded thereto, the floor plate 14 resting upon the bed 11 and the socket member 15 projecting through an opening in the bed. Diagonal braces 16 are preferably provided to strengthen the socket construction. The hoist comprises a support including a horizontal supporting plate 20 adapted to rest upon the floor plate 14, the plate preferably having a short pin 21 projecting downwardly therefrom for reception in a small opening in the floor plate 14 to prevent relative rotation of the two plates when a portion of a tubular post 23 is inserted in the socket 15, the post projecting through and being welded to the plate 20. The supporting structure comprises the tubular post 23 rising from the rear portion of the plate 20, the post being braced by a pair of stiffening flanges 24. Plate stiffening flanges 25 extending diagonally outward from the foot of post 23 likewise strengthen the construction. It is to be appreciated that the details of the support may vary depending upon the materials at hand and the taste of the fabricator, provided that a rigid supporting structure comprising a short, vertical post, a horizontal supporting plate, and a depending portion of the post forming a socket insert are provided.

The post is further braced by welding thereto along its front surface a short length of channel bar 26 which provides a flat, forwardly facing surface upon which operating mechanism is mounted. The operating mechanism comprises a reversible, battery-operable motor 30 mounted on the face of the channel bar 26 by a strap 31 or equivalent means with the armature shaft of the motor extending vertically upward. Above the motor there is mounted reduction gear mechanism 32 connected to the shaft of the motor through a flexible connector 33. The reduction gear mechanism drives a small sprocket 34 about which passes a sprocket chain 35. The chain drives a large sprocket 36 mounted upon a shaft 37 supported in arms 38 extending forwardly in spaced relation at the top of the channel member 26. A drum 39 is fastened to shaft 37 between the arms 38 and a cable 40 is associated with the drum, one end of the cable being fastened to the drum and the remainder thereof being wound upon the drum or let out therefrom in accordance with the direction of rotation of motor 30. The cable 40 passes into the interior of the post 23 through an opening 41 and about a first guide pulley 42 rotatably mounted in the post. The cable then passes upwardly through the post and through a pivot sleeve 43 welded into the upper end of the post and projecting thereabove.

A boom is rotatably mounted upon the upper end of the post, the same comprising a vertical, tubular pivot portion 44 telescoped about the upper end of the bearing sleeve 43, with its lower end resting upon the upper end of the tubular post 23. A horizontal, tubular arm 45 is welded to the upper end of member 44 and is braced by a diagonally extending tube 46 welded thereto and to the lower end of the extension 44. The cable 40 passes about a second guide pulley 47 mounted in a bracket 48 at the upper end of extension 44 and a third guide pulley 50 mounted in a bracket 51 at the outer end of boom arm 45. Preferably the outer end of the boom arm is provided with an eye 52 into which may be hooked a cargo hook (not shown) or similar member fastened to the end of the cable 40. Greater lifting power may thus be achieved by forming a bight in the cable in which may ride a free block (not shown). Also, the eye provides means for lashing the boom in place when desired, or for anchoring the end of the cable when desired.

The motor 30 may be permanently connected to a battery mounted in the vehicle, but it is preferably connected to the operating battery of the vehicle through the means of a flexible cable 55 having a prong connector 56 at the end thereof for association with convenient socket means connected to the battery. The motor is preferably controlled through a control switch 57 having a pair of operating buttons, each of which causes the motor to operate in one direction upon depression thereof. The switch 57 is a small unit which may be held in the hand and carried about from place to place at the end of a relatively long, flexible cable 58. The cable 58 contains three wires, one of which is connected to a terminal of cable 55 and the other two being appropriately connected into a control circuit including a pair of solenoids 60 and 61 conveniently mounted upon the motor.

Figure 4:
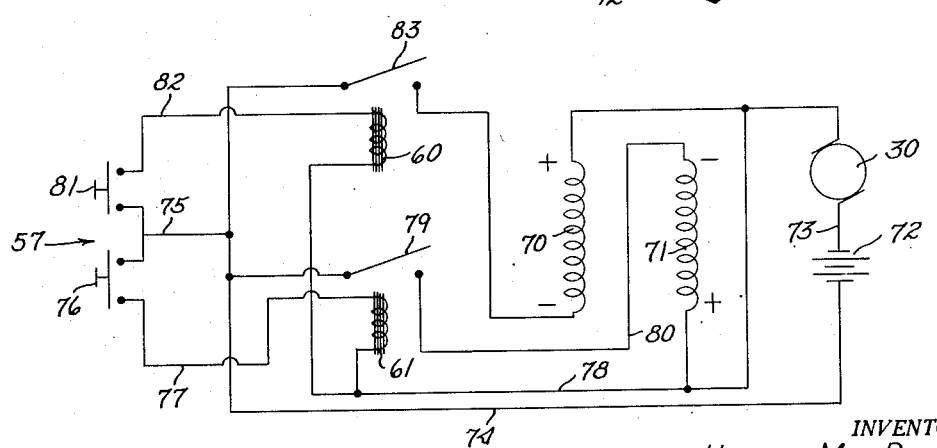
Fig. 4 is a schematic control diagram.

A form of control circuit which may be utilized is set forth in Fig. 4 wherein the motor 30 is shown as having a pair of oppositely effective fields 70 and 71. The motor is connected to one terminal of battery 72 through a wire 73, the other side of the battery being connected to wire 74 which leads to the common wire 75 of cable 58. One of the button-operated switches 76 of the control switch is connected by a wire 77 which leads to one of the solenoids 61, the opposite side of which is connected by wire 78 to the opposite side of the battery. When the solenoid 61 is energized a switch 79 is closed to connect wire 74 to wire 80 leading to one side of the field 71, the other side of which is connected to wire 78. When the other switch 81 of the manual switch unit is closed wire 74 is connected to wire 82 leading to the second solenoid 60, the opposite side of which is connected to wire 78. When solenoid 60 is energized a switch 83 is closed to connect wire 74 to one end of field 70, the other end of which is connected back to the opposite side of the battery. The foregoing circuit is, of course, schematic and many variations thereof may be achieved within the ability of those skilled in the art. However, it is an important feature of my invention that the battery-driven, reversible motor 30 comprises two field windings 70 and 71 driving the single armature, the field winding which is not in use at the time comprising a closely associated, highly heat conductive mass for absorbing the heat of operation of the motor when elevating a load, thereby increasing the efficiency and prolonging the life of the apparatus.

Figure 3:
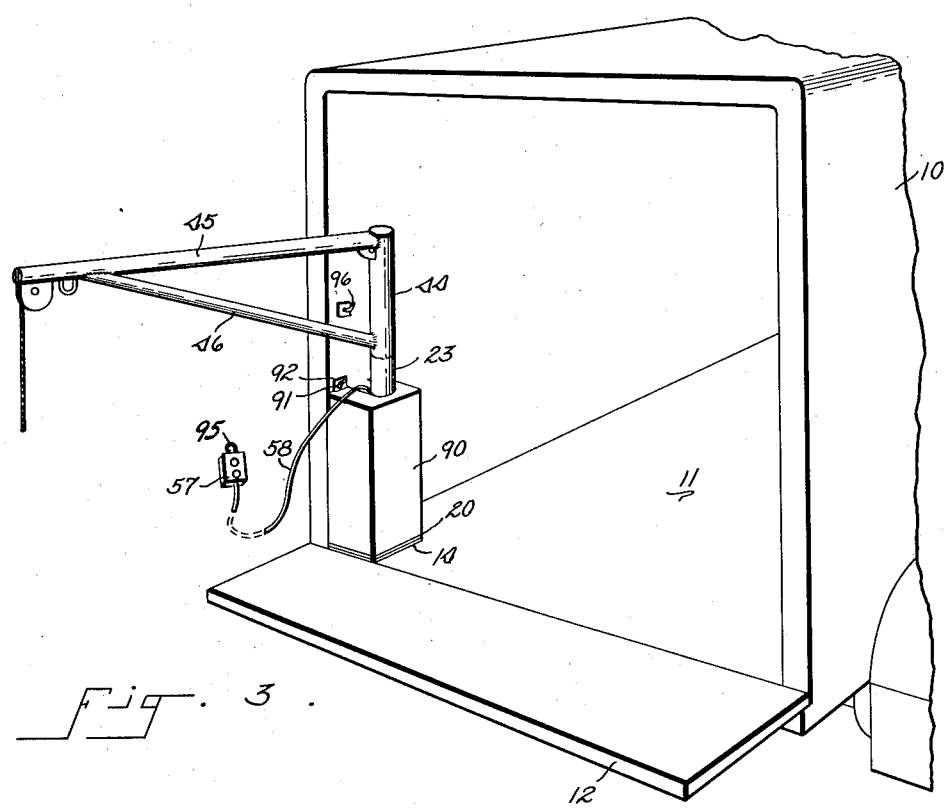
Fig. 3 is a perspective view of the rear end of a truck having the present invention mounted therein.

Fig. 3 illustrates a preferred arrangement of the present invention wherein it is seen that the floor plate 14 is mounted closely adjacent a rear corner of a truck bed so that the boom may swing through the open end of the truck and so that as little of the access opening is blocked as possible. When in use the operating mechanism is preferably enclosed within a protecting case 90 which may be conveniently fastened in position as by means of wing nuts 91 passing through ears 92 or equivalent means. The cable 58 passes outwardly through any convenient opening in the case 90 in order that the switch 57 may be carried about. The switch 57 is preferably provided with an eye 95 by means of which the switch may be hung on a wall-mounted hook 96 or the like, the hook preferably being large enough to support a coil of cable.

Having illustrated and described a preferred embodiment of my invention, it should be apparent to those skilled in the art that the invention permits of modification in arrangement and detail. I claim as my invention all such modifications as come within the true spirit and scope of the appended claims.

I claim:

1. A freight hoist for association with a vehicle comprising a vertical post, a swinging boom rotatably mounted upon the upper end of said post, a horizontal plate fastened to the lower end of said post, a supporting member projecting downwardly from said plate in position to be inserted in a vertical socket in the vehicle whereby said post may be removably mounted on the vehicle, a battery operable motor mounted on the lower end of said post above said plate, reduction gearing driven by said motor and mounted on said post, a drum driven through said reduction gearing and mounted on said post, a cable having one end fastened to said drum, vertically disposed guide pulleys associated with said post and said boom, said pulleys including a first pulley mounted on said post adjacent said drum, a second pulley mounted on the pivoted end of said boom and a third pulley mounted on the free end of said boom, said first and second pulleys having portions of their peripheries lying substantially along the axis of said post and the axis of rotation of said boom respectively, said cable passing about said guide pulleys whereby freight may be elevated into said vehicle or lowered therefrom, and a control circuit operatively associated with said motor including means whereby said motor may be separably connected to a battery mounted upon the vehicle, a motor controlling manual switch, and a long, free cable connecting said switch to said motor whereby the motor may be controlled by an operator moving about at a distance from said post.

2. The construction set forth in claim 1 wherein said motor is mounted with its shaft extending vertically upward parallel to said post, said reduction gearing is mounted above said motor, and said drum is mounted above said reduction gearing, whereby a compact mechanism is provided which may be mounted closely adjacent the rear corner of a truck or similar vehicle.

3. The combination with a vehicle having a cargo carrying bed, of means providing a vertical socket adjacent a rear corner of the cargo bed, and a freight hoist removably associated with said vehicle including a vertical member adapted to be removably inserted into said socket, a post mounted on said member, a battery operable, reversible electric motor mounted upon said post, a drum mounted upon said post above said motor and operatively connected thereto, a boom rotatably mounted on the upper end of said post, guide pulleys mounted upon said post and said boom, said pulleys including a first pulley mounted on said post adjacent said drum, a second pulley mounted on the pivoted end of said boom, and a third pulley mounted on the free end of said boom, said first and second pulleys having portions of their peripheries lying substantially along the axis of said post and the axis of rotation of said boom respectively, and said boom and post being hollow and in communication with each other in a straight line between said peripheral portions of said first and second pulleys, a cable associated with said drum and passing about said guide pulleys whereby freight may be elevated or lowered through the operation of said motor, separable means for connecting said motor to the battery system of said vehicle, and switch means for controlling the direction of rotation of said motor.

4. A vehicle including means providing a vertical, upwardly opening socket on the vehicle, and hoisting means removably associated therewith, said hoisting means including a vertical post adapted to be removably inserted into said socket, a flange fixed to said post to limit insertion thereof into said socket and provide lateral stability for said post, a boom rotatably mounted upon the upper end of said post, a battery operable, reversible electric motor mounted on the vehicle, a drum operatively connected to said motor, guide pulleys mounted upon said post and said boom, said pulleys including a first pulley mounted on said hoisting means and having a peripheral portion aligned with the axis of said post, a second pulley mounted on said boom and having a peripheral portion aligned with the axis of rotation thereof, and a third pulley mounted on the free end of said boom, said pulleys having horizontal axes of rotation, and said post and the portion of said boom pivotally mounted thereon being internally open in a straight line between said peripheral portions of the pulleys aligned with the axes thereof, a cable partially wound upon said drum and passing about said guide pulleys whereby freight may be elevated or lowered through the operation of said motor, motor reversing means associated with said motor, an elongated conductor cable connected at one end to said motor reversing means, and a reversing switch connected to the free end of said cable conductor whereby the motor may be controlled by an operator moving about the vehicle.

5. The combination with a vehicle, of means providing a vertical, upwardly opening socket on the vehicle, a post removably inserted in said socket and having means thereon for limiting insertion of said post and providing lateral stability thereof, a boom rotatably mounted on the upper end of said post, guide pulleys mounted on said post and said boom, said pulleys including a first pulley mounted on said hoisting means and having a peripheral portion aligned with the axis of said post, a second pulley mounted on said boom and having a peripheral portion aligned with the axis of rotation thereof, and a third pulley mounted on the free end of said boom, said pulleys having horizontal axes of rotation, and said post and the portion of said boom pivotally mounted thereon being internally open in a straight line between said peripheral portions of the pulleys aligned with the axes thereof, a cable passing about said guide pulleys, and means mounted on said vehicle for reeling in or paying out said cable comprising a reversible, battery-operated motor, reversing means connected to said motor and including a length of conductor cable having one end free, said conductor cable being of considerable length whereby the free end thereof may be carried to some distance from the vehicle, and switch means connected to the free end of said conductor cable.

6. The combination with a vehicle, of hoisting apparatus including means providing a vertical socket on a portion of the vehicle, a hollow post removably mounted in said socket and projecting upwardly into the vehicle, a boom comprising a hollow, vertical pivot portion and a lateral arm connected to said pivot portion, pivot means rotatably mounting said pivot portion on the upper end of said post as an aligned extension thereof, the interiors of said post and said pivot portion being in open communication with each other in a straight line, a pulley mounted on said pivot portion and having a peripheral portion aligned with the axis of rotation thereof, another pulley mounted on the free end of said arm, said pulleys having parallel, horizontal axes of rotation, and power means mounted on said vehicle comprising a reversible, battery-operable motor, a drum rotatively connected to said motor, a hoisting cable partially wound upon said drum, guiding means adjacent said drum for guiding said cable into the lower interior of said post from said drum, said hoisting cable then passing upwardly through said post and pivot portion, then about the pulley mounted on said pivot portion, then along said arm and about the pulley on the free end of said arm, the free end of said hoisting cable depending from said arm, a motor controlling switch, and an elongated conductor cable operatively connecting said switch to said motor, said conductor cable being fixed only at its end leading to said motor whereby said switch may be carried around by an operator walking about the vehicle.

HARRY M. REED.

REFERENCES CITED

The following references are of record in the file of this patent:

UNITED STATES PATENTS

| Number | Name | Date |
|---|---|---|
| 430,487 | Shaw | June 17, 1890 |
| 1,439,174 | Kryl | Dec. 19, 1922 |
| 2,503,590 | Ormsby | Apr. 11, 1950 |
| 2,517,813 | Wallace | Aug. 8, 1950 |